US006792384B2

(12) United States Patent
Kobayashi et al.

(10) Patent No.: US 6,792,384 B2
(45) Date of Patent: Sep. 14, 2004

(54) METHOD FOR PRODUCING FLUID TRAP FOR FILM ASSEMBLAGE

(75) Inventors: Kenji Kobayashi, Kanagawa (JP); Toshiyuki Nishiyama, Kanagawa (JP); Minoru Ono, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/378,831

(22) Filed: Mar. 5, 2003

(65) Prior Publication Data

US 2003/0171893 A1 Sep. 11, 2003

(30) Foreign Application Priority Data

Mar. 7, 2002 (JP) ....................................... 2002-061850

(51) Int. Cl.[7] ................................................ G03B 17/50

(52) U.S. Cl. ........................... 702/170; 396/32; 396/36; 396/583

(58) Field of Search ............................ 702/170; 396/30, 396/31, 32, 365, 527, 583

(56) References Cited

U.S. PATENT DOCUMENTS 3,680,456 A * 8/1972 Nerwin ....................... 396/365
6,186,680 B1 * 2/2001 Mizuno ....................... 396/527
6,192,197 B1 * 2/2001 Ono ............................ 396/30
6,327,432 B1 * 12/2001 Kobayashi et al. ........... 396/31
6,356,712 B1 * 3/2002 Motomura et al. ........... 396/32

FOREIGN PATENT DOCUMENTS

| | | |
|---|---|---|
| JP | 6-87155 | 11/1994 |
| JP | 2000-122252 | 4/2000 |
| JP | 2000-235116 | 8/2000 |
| JP | 2001-330927 | 11/2001 |

* cited by examiner

*Primary Examiner*—John Barlow
*Assistant Examiner*—Hien Vo
(74) *Attorney, Agent, or Firm*—Sughrue Mion, PLLC

(57) ABSTRACT

A method for producing a fluid trap for an instant film assemblage, which method can produce an environment-friendly trap easily and at low cost, is disclosed. A plate-shaped paper material having a uniform width and a uniform thickness is passed through a clearance formed between a pair of rollers. The plate-shaped paper material is compressed at width-directional opposite end portions thereof such that a thickness of the paper material gradually decreases from a central portion thereof toward opposite ends thereof, and at the same time, the paper material is cut along a longitudinal direction thereof to a predetermined width. Thereafter, the paper material is cut along the width direction thereof at predetermined intervals with respect to the longitudinal direction thereof, thereby producing the trap.

13 Claims, 7 Drawing Sheets

METHOD FOR PRODUCING FLUID TRAP FOR FILM ASSEMBLAGE

BACKGROUND OF THE INVENTION

1. Field of the Invention

The present invention relates to a method for producing a fluid trap for a film assemblage containing a peel-apart type instant film unit.

2. Description of the Related Art

Self-developing type instant film units are generally classified into mono-sheet type units and peel-apart type units, the latter of which have been used for a long time. The peel-apart type instant film unit includes a photosensitive sheet and an image receiving sheet, which are connected together via a connecting sheet and are separately accommodated at opposite sides of a body of the unit. The peel-apart type instant film unit is hereinafter simply referred to as a "film unit". After exposure, as a user pulls a drawing sheet from a nip between a pair of spreading rollers, the photosensitive sheet and the image receiving sheet are overlapped with each other via movement of the connecting sheet connected with the drawing sheet. As the overlapped sheets are further pulled, a pod containing a developing solution is ruptured by the pair of spreading rollers and the developing solution is spread between the photosensitive sheet and the image receiving sheet.

An image frame sheet is separably attached to the image receiving sheet, and spacers are adhered to the image frame sheet at opposite ends thereof in a direction substantially perpendicular to a direction in which the image receiving sheet is pulled. The image frame sheet is hereinafter also referred to as a "mask". The spacers are hereinafter also referred as "rails". A spreading width of the viscous developing solution contained in the pod is determined by a distance between the pair of spacers. A spreading thickness of the viscous developing solution is regulated by a total thickness of the mask and the rail. In order to evenly spread the viscous developing solution between the image receiving sheet and the photosensitive sheet, and in order to prevent defects due to insufficient spreading of the developing solution, the pod contains a slightly excessive amount of the developing solution. Then, a portion of the developing solution remaining after the developing solution has been spread within an area in the image frame is stopped by fluid traps, which are disposed at the spacers. Each of the fluid traps is formed to have a trapezoidal or semicylindrical sectional form. A height of the sectional form of the trap is several times greater than the total thickness of the mask and the rail. Therefore, a spreading thickness of the developing solution in the area near the fluid traps is several times greater than a spreading thickness of the developing solution in other areas, and a spreading length is reduced by several times. Therefore, the developing solution does not leak out of the film unit.

The fluid trap is produced by: using polyvinyl chloride to form a continuous body of polyvinyl chloride by profile extrusion, applying a hot melt coating to the formed continuous body, and cutting the continuous body. The fluid trap is slow to set during profile extrusion and significantly deforms when the continuous body is taken up on a reel. Thus formed, the continuous body of polyvinyl chloride is not easily machined and produces a large amount of cutting waste. Further, plastic extrusion requires water cooling for maintaining a trap shape of a base material after the hot melt coating is applied to the base material. Therefore, a large system is necessary. Because of the slow forming speed and the large system, overall costs of producing the trap become large.

Moreover, these days, people are paying attention to how businesses make efforts to reduce environmental problems. It is becoming a social responsibility for those who sell products to reduce negative impacts of their products on the environment as much as possible. As a result, there is demand for using a more environment-friendly material, rather than a formed material made of a resin such as polyvinyl chloride.

SUMMARY OF THE INVENTION

Therefore, a task of the present invention is to solve the above-described conventional problems and achieving the following object. An object of the invention is to provide a method for producing a fluid trap for an instant film assemblage, which method can produce an environment-friendly trap easily and at low costs.

The above-described object is accomplished by a method for producing a fluid trap for an instant film assemblage disclosed herein. First, an instant film assemblage in the method of the invention contains at least one peel-apart type instant photographing film unit. The film assemblage includes a body. The body includes a substantially rectangular parallelepiped box-like case body including an exposure opening formed on a top surface thereof and a film unit ejection port formed on a front wall continuous to the top surface. Further, a film platen is accommodated between the top surface and a bottom surface of the case body. A photosensitive sheet connected with a drawing sheet is accommodated on an upper surface of the film platen such that the photosensitive sheet is oriented to the exposure opening. An image receiving sheet connected with the drawing sheet via a connecting sheet is accommodated under a lower surface of the film platen. The photosensitive sheet, the image receiving sheet and the drawing sheet are disposed such that when a tip of the drawing sheet projecting from the ejection port is pulled by an operator, the photosensitive sheet and the image receiving sheet overlap each other and are pulled out from the ejection port. The drawing sheet includes a developing solution pod. At least one spacer for regulating a developed thickness of the developing solution is separably adhered to the drawing sheet at opposite end portions in a direction substantially perpendicular to a direction in which the image receiving sheet is drawn. At least one fluid trap is disposed at at least one development terminal end of the at least one spacer.

According to the invention, the trap is produced in the following manner. A plate-shaped paper material having a uniform width and a uniform thickness is moved through a clearance formed between a pair of rollers. The plate-shaped paper material is compressed at width-directional opposite end portions thereof such that a thickness of the paper material gradually decreases from a central portion thereof toward opposite ends thereof, and at the same time, the paper material is cut along a longitudinal direction thereof to a predetermined width. Thereafter, the paper material is cut along the width direction thereof at predetermined intervals with respect to the longitudinal direction thereof.

The plate-shaped paper material may have a basis weight ranging from 300 to 500 $g/m^2$. Further, the plate-shaped paper material may have an apparent density ranging from 0.55 to 0.65 $g/m^3$.

DETAILED DESCRIPTION OF THE EMBODIMENT

Figure 1:
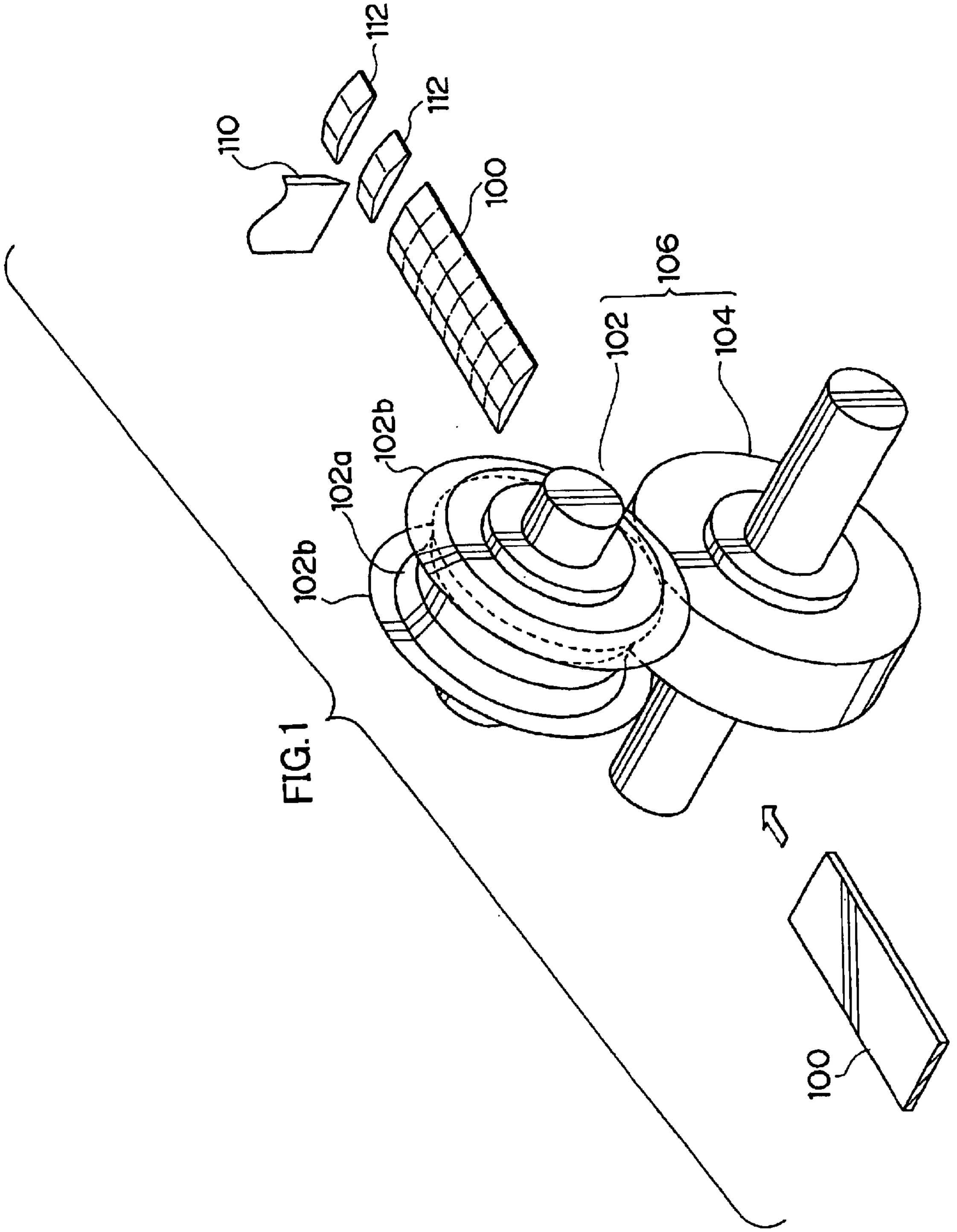
FIG. 1 is a schematic view for explaining a method for producing a fluid trap for an instant film assemblage according to an embodiment of the present invention.

An embodiment of the present invention will now be described with reference to the drawings. It should be noted that parts having substantially similar functions are respectively designated by the same reference numerals throughout the drawings, and description thereof may not be repeated.

Figure 2:
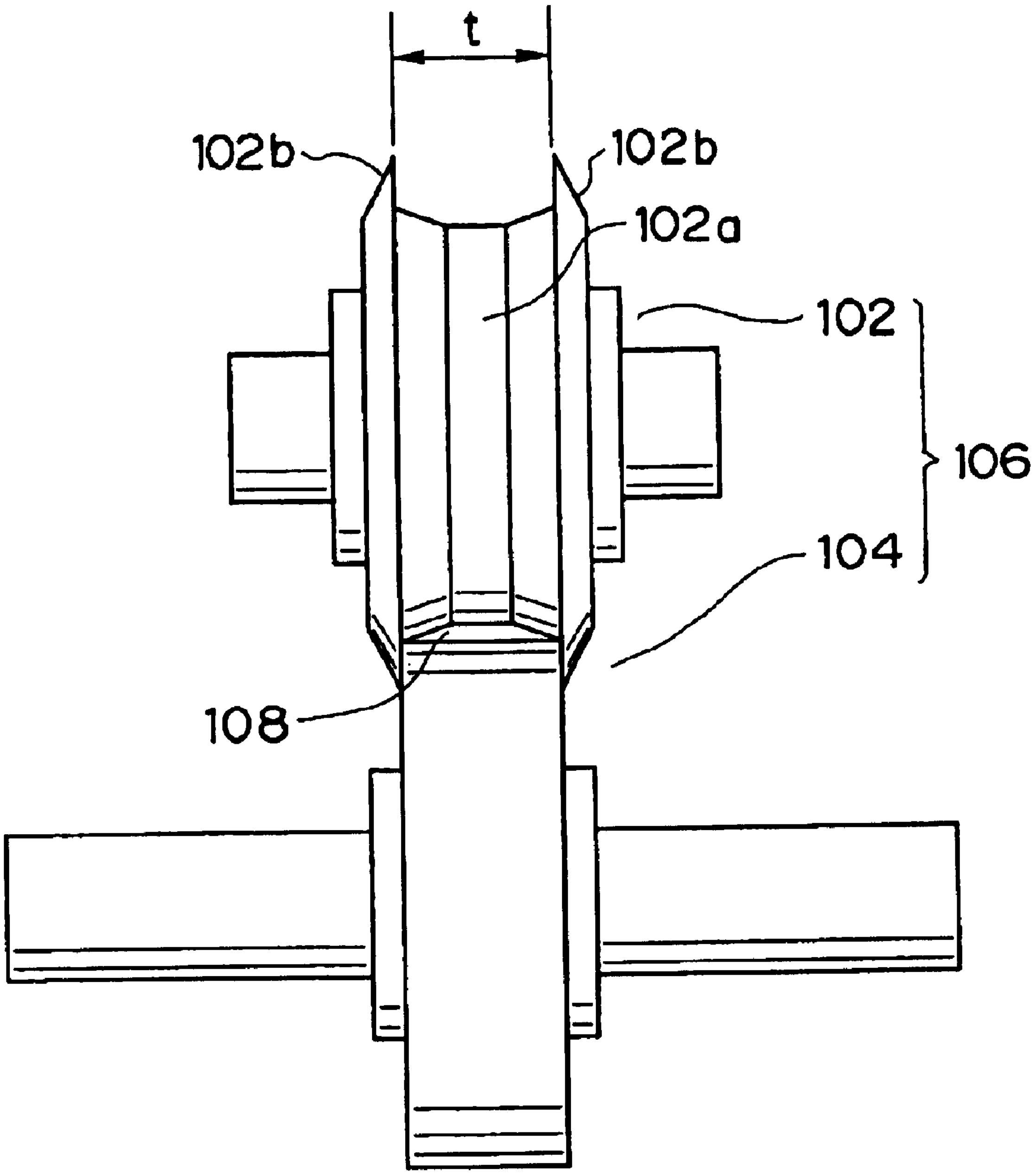
FIG. 2 is a front view showing a pair of rollers used in the method for producing a fluid trap for an instant film assemblage according to the embodiment of the invention.
Figure 3:
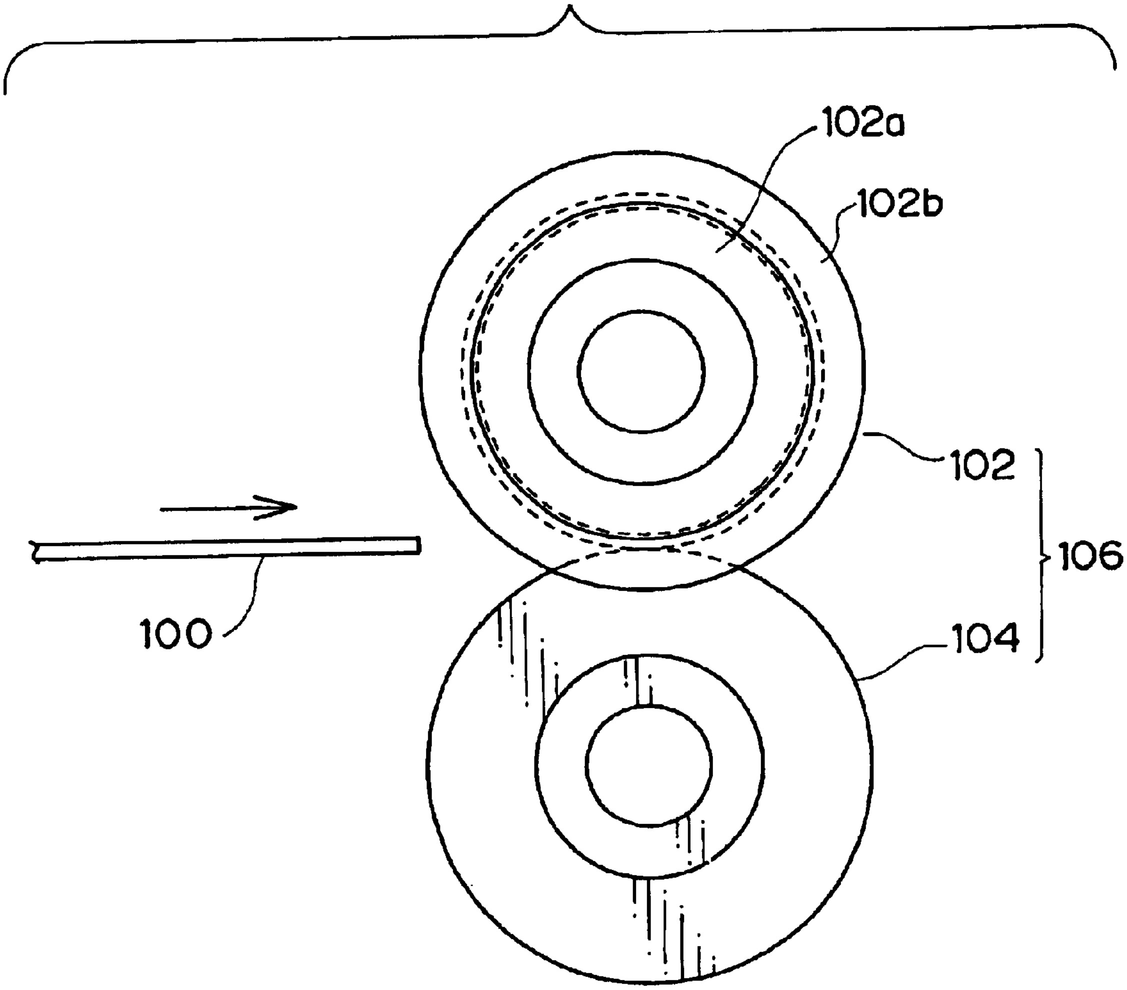
FIG. 3 is a side view showing the pair of rollers used in the method for producing a fluid trap for an instant film assemblage according to the embodiment of the invention.

FIG. 1 is a schematic view for illustrating a method for producing a fluid trap for a film assemblage according to the embodiment of the invention. FIG. 2 is a front view showing a pair of rollers used in the method. FIG. 3 is a side view showing the pair of rollers used in the method.

First, as shown in FIGS. 1 to 3, a plate-shaped paper material 100 is passed, along a longitudinal direction thereof, through a clearance 108, which is formed between a pair of rollers 106 including a forming roller 102 and an auxiliary forming roller 104 rotated by a driving means (not shown).

Among the pair of rollers 106, the forming roller 102 includes a roller body 102*a* and flange-shaped cutting portions 102*b*. The roller body 102*a* is shaped such that a circumferential surface thereof is inclined in straight lines from opposite ends of the roller body 102*a* in the axial direction thereof (shown by "t" in FIG. 2) toward a central portion thereof in the axial direction so that the central portion of the roller 102*a* has a diameter smaller than a diameter of the opposite end portions of the roller 102*a*. The flange-shaped cutting portions 102*b* are disposed at the opposite ends of the roller body 102*a* and protrude radially in a direction substantially perpendicular to the axial direction of the roller body 102*a*.

Next, the auxiliary forming roller 104 is disposed such that side walls thereof abut on inner walls of the two flange-shaped cutting portions 102*b* so that the clearance 108 is formed between the forming roller 102 and the auxiliary forming roller 104. The inner walls of the flange-shaped cutting portions 102*b* and the side walls of the auxiliary forming roller 104 intervening with each other prevents deformation of the clearance 108 due to runout during rotation of the rollers, or the like. A sectional form of the clearance 108 viewed in a direction in which the plate-shaped paper material 100 is inserted is trapezoidal, so that width-directional opposite end portions of the plate-shaped paper material 100 are compressed by the forming roller 102.

The plate-shaped paper material 100, which has passed though the clearance 108 formed between the pair of rollers 106 including the forming roller 102 and the auxiliary forming roller 104, is compressed at the width-directional opposite end portions to have a trapezoidal sectional form, whose thickness gradually decreases from the central portion toward the opposite ends, and is cut along the longitudinal direction thereof by the flange-shaped cutting portions 102*b* to a predetermined width. It should be noted that the width-directional opposite end portions of the plate-shaped paper material 100 to be compressed are opposite end portions of the plate-shaped paper material 100 which have been cut along the longitudinal direction by the flange-shaped cutting portions 102*b* to the predetermined width. Thereafter, a hot melt coating is applied to the plate-shaped paper material 100, and the plate-shaped paper material 100 is cut along the width direction by a cutting means 110, such as a cutter, at predetermined intervals with respect to the longitudinal direction, thereby producing fluid traps 112. Then, the obtained fluid traps 112 are adhered at predetermined positions on a film assemblage.

A basis weight of the plate-shaped paper material 100 may be in a range of 300 to 500 g/m$^2$, and more often 350 to 450 g/m$^2$. An apparent density of the plate-shaped paper material 100 may be in a range of 0.55 to 0.65 g/cm$^3$. Setting the basis weight and the apparent density to within the above ranges provides the plate-shaped paper material 100 with a sufficient thickness for stabilizing the plate-shaped paper material 100 so as not to be curled or twisted when passing through the clearance 108. It should be noted that the apparent density may be derived according to JIS P8118 (corresponding to ISO 534:1988 or ASTM D 645).

As described above, in the embodiment, when the plate-shaped paper material 100 having a uniform width and a uniform thickness is continuously passed through the trapezoidal clearance 106 formed between the pair of rollers 106 including the forming roller 102 and the auxiliary forming roller 104, the width-directional opposite end portions of the plate-shaped paper material 100 are compressed along a contour of the roller body 102*a* of the forming roller 102 to be thinner than the central portion of the plate-shaped paper material 100, and are cut along the longitudinal direction by the flange-shaped cutting portions 102*b* of the forming roller 102 to the predetermined width. Then, the plate-shaped paper material 100 is successively cut along the width direction, thereby obtaining the fluid traps 112. Therefore, in comparison with profile extrusion using vinyl chloride, or the like, a forming speed is increased. Further, since the paper material is used, there is no need for a cooling device, which is necessary in a case of a resin material, such as vinyl chloride, for keeping a shape of the resin material when a hot melt coating is applied thereto, and therefore, the fluid traps can be produced using a simple system. Moreover, the plate-shaped paper material 100 has a lesser tendency to be curled or twisted when it passes through the clearance 108 than a resin material.

It should be noted that, although the width-directional opposite end portions of the forming roller 102 used in the above-described embodiment are inclined in straight lines toward the central portion thereof, the opposite end portions of the forming roller 102 may be inclined in curved lines. Further, although the sectional form of the clearance 108 between the forming roller 102 and the auxiliary forming roller 104 is trapezoidal in the above-described embodiment, the sectional form of the clearance 108 may be any shape, such as a semicircle or a segment, as long as it is suitable for compressing the width-directional opposite end portions of the plate-shaped paper material 100.

Similarly, although the sectional form of the fluid trap 112 produced according to the above-described embodiment is trapezoidal, since the sectional form of the fluid trap 112 depends on the sectional form of the clearance 108 formed between the forming roller 102 and the auxiliary forming roller 104, the sectional form of the fluid trap 112 may be any shape, such as a semicircle or a segment, as long as it is a shape in which a thickness at opposite end portions is thinner than that at a central portion.

An example of a film assemblage employing the fluid traps provided by the production method according to the invention will now be described.

Figure 4:
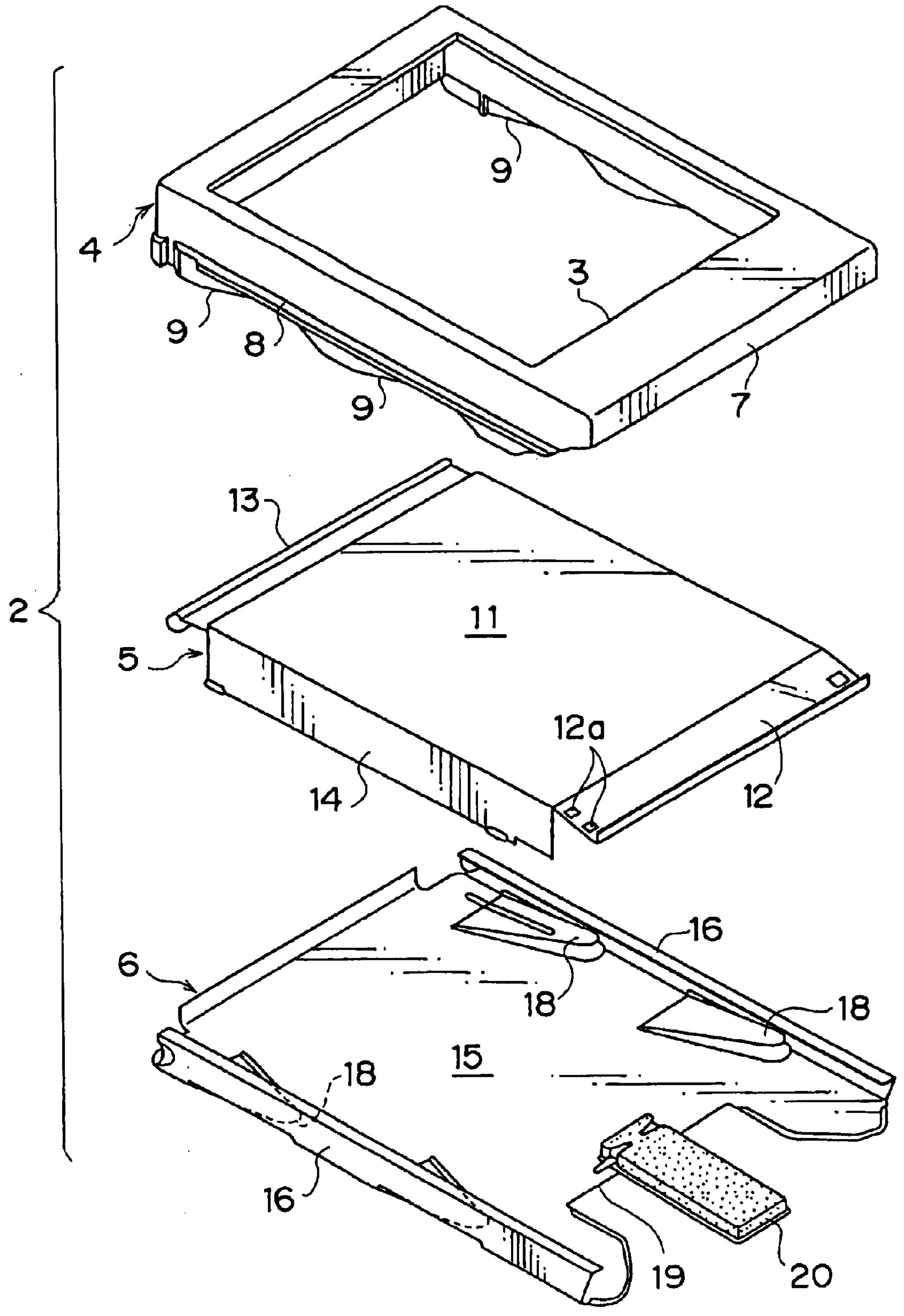
FIG. 4 is an exploded perspective view showing a body of the instant film assemblage.

FIG. 4 schematically shows a structure of a film assemblage for accommodating a peel-apart type film unit. The film assemblage may be called 'film pack', or 'packfilm'. A body 2 includes an upper case 4 forming a top surface of a substantially rectangular parallelepiped box-shaped case body, a bottom lid 6 covering a bottom opening of the upper case 4 to form a bottom surface of the case body, and a film platen 5 accommodated between the upper case 4 and the bottom lid 6. An exposure opening 3 is formed in the upper case 4. A lower edge of a front wall 7 of the upper case 4 is positioned higher than lower edges of back and side walls of the upper case 4, so that an ejection port for the film unit is formed below the front wall 7 when the bottom lid 6 is attached to the upper case 4 so as to cover the bottom opening of the upper case 4.

Figure 5:
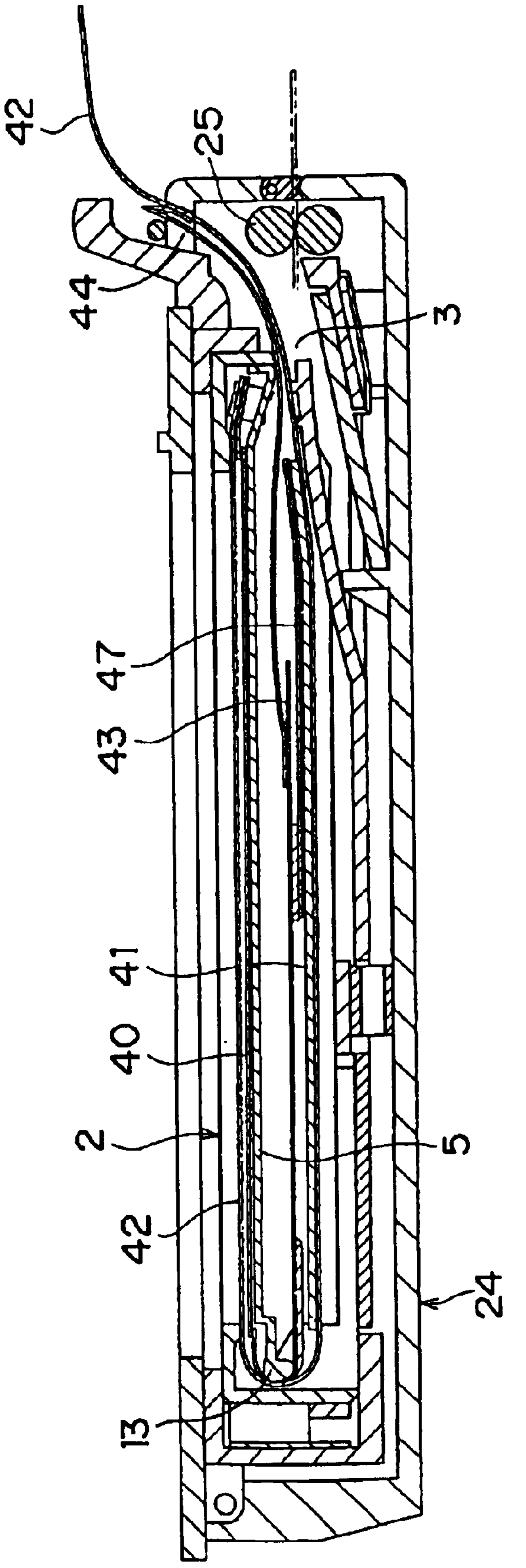
FIG. 5 is a sectional view showing the body of the film assemblage accommodated in a holder.

FIG. 5 is a sectional view of the film assemblage when it is inserted in a holder 24. The peel-apart type film unit is accommodated in the body 2 with a photosensitive sheet 40 and an image receiving sheet 41 being separated by the film platen 5. Before use, the exposure opening 3 of the body 2 is covered with a light shielding sheet 42. It should be noted that the body 2 may accommodate ten film units. However, only one unit is shown besides the light shielding sheet 42 in FIG. 5 in order to avoid complication of the drawing. The photosensitive sheet 40 and the image receiving sheet 41 are connected to a drawing sheet 43 via a connecting sheet 44. The photosensitive sheet 40 is positioned above the film platen 5 and is oriented toward the exposure opening 3, and the image receiving sheet 41 is positioned below the film platen 5.

Figure 6:
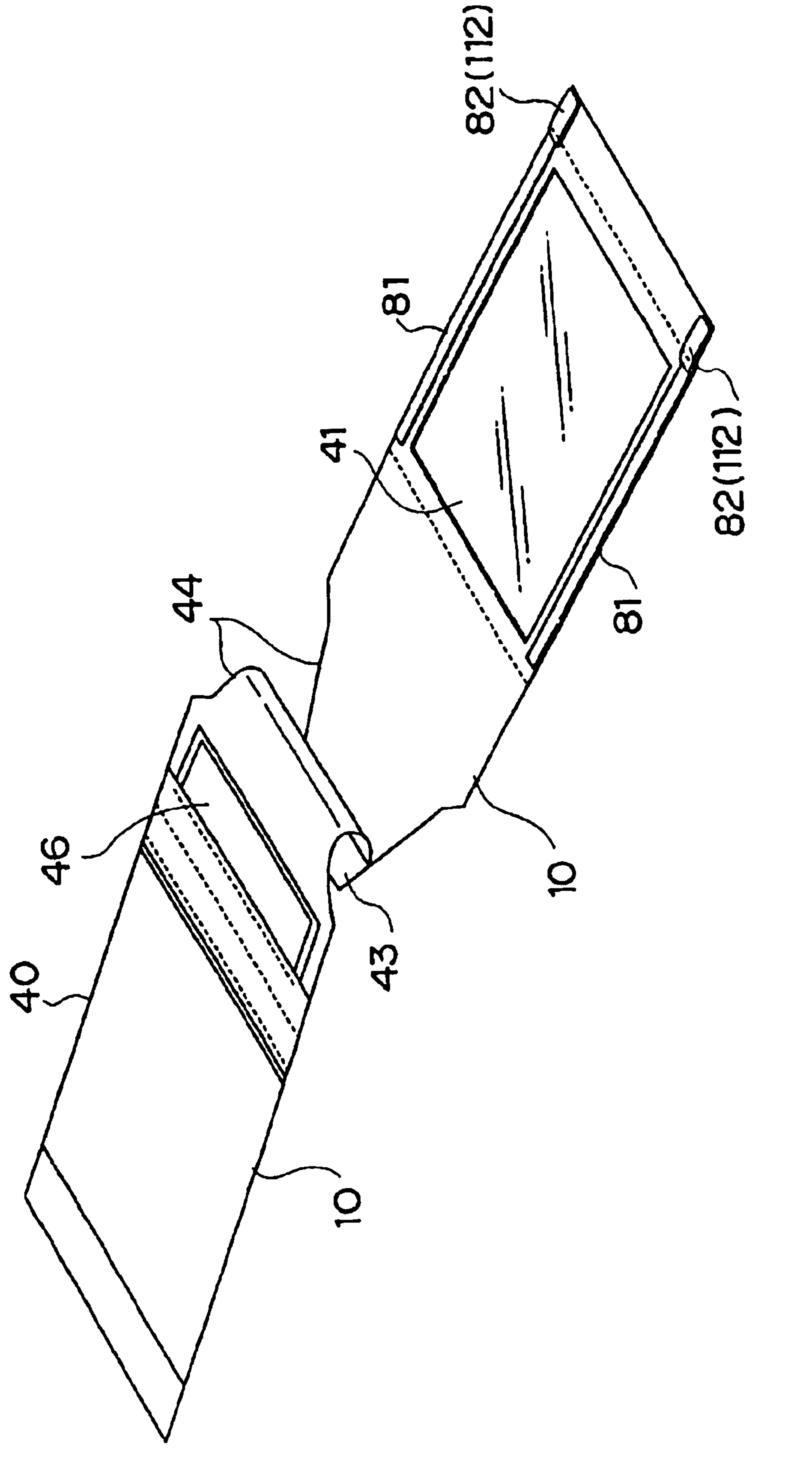
FIG. 6 is a perspective view showing a structure of a film unit.

FIG. 6 shows a structure of the film unit 10. The film unit 10 is structured such that, when the photosensitive sheet 40 and the image receiving sheet 41 are drawn by the connecting sheet 44 which is integrally connected with the drawing sheet 43, the photosensitive sheet 40 and the image receiving sheet 41 face each other and enter a nip between spreading rollers 25.

When a user pulls the drawing sheet 43, which projects from the nip between the spreading rollers 25, the photosensitive sheet 40 moves leftward in FIG. 5 and is inverted at a bend 13 (see FIG. 4) of the film platen 5, and then advances rightward below the film platen 5 with an exposed surface thereof facing down. Along with this movement, a pod 46 attached to the drawing sheet 43 passes the image receiving sheet 41 and approaches the spreading rollers 24. After the connecting sheet 47, which couples the image receiving sheet 41 with the drawing sheet 43, has been completely extended and the exposed surface of the photosensitive sheet 40 has moved to a position where it faces the image receiving sheet 41, the photosensitive sheet 40 and the image receiving sheet 41, which are overlapped with each other and pulled by the drawing sheet 43, which is in turn pulled by the user, move toward the spreading rollers 25.

Figure 7:
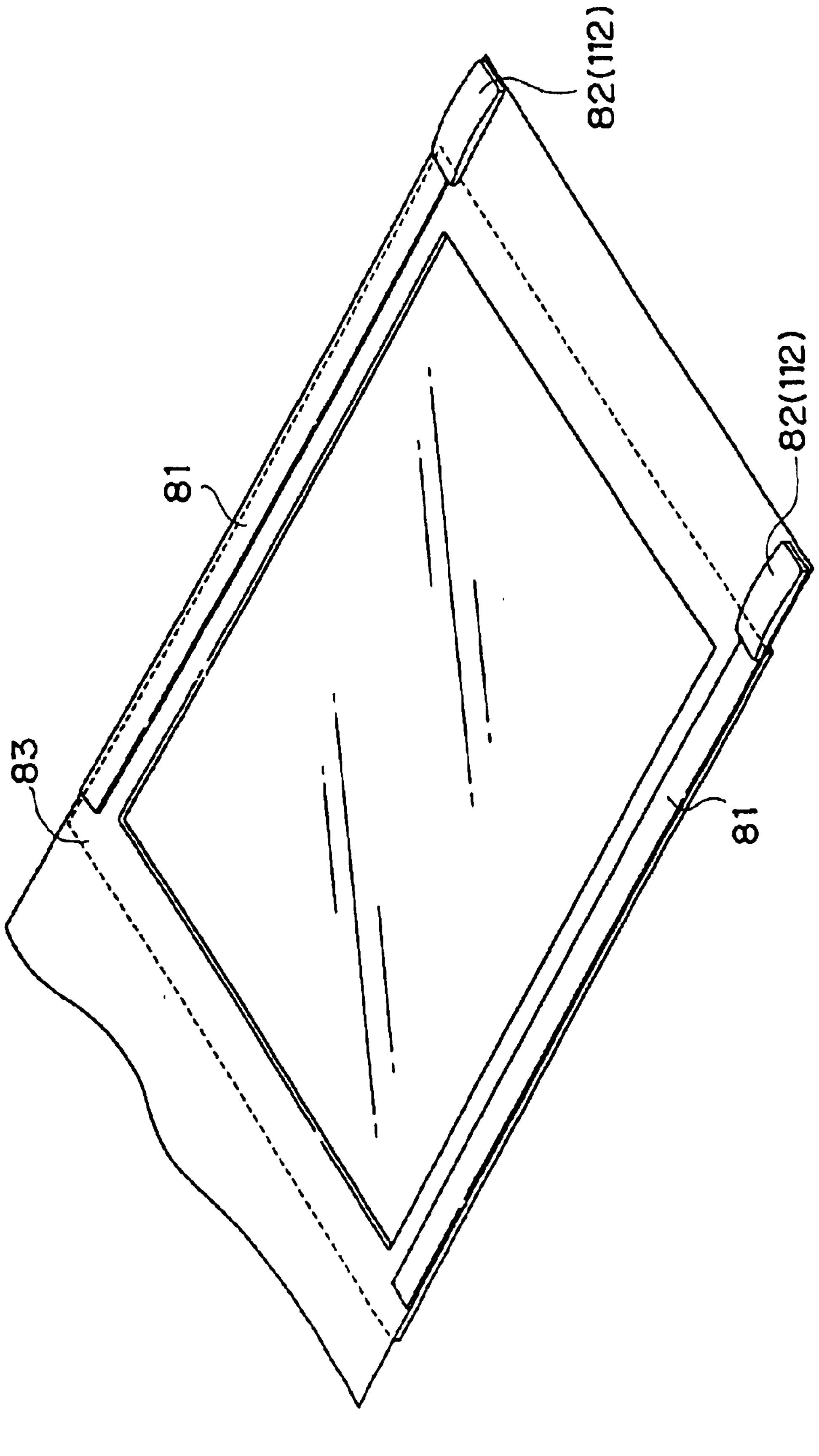
FIG. 7 is an enlarged perspective view showing an image receiving sheet.

Immediately before being pulled out, the pod 46 is ruptured by the spreading rollers 25, and a developing solution contained in the pod 46 is spread evenly between the photosensitive sheet 40 and the image receiving sheet 41 as the operator continues to pull the drawing sheet 43. FIG. 7 is an expanded view of the image receiving sheet. A pair of spacers 81 are attached, via a separable image frame sheet, at opposite ends of the image receiving sheet along a direction substantially perpendicular to a direction in which the image receiving sheet is pulled. A pair of fluid traps 82 (112) are disposed at terminal ends of the spacers. As the film unit is pulled out, a portion of the developing solution remaining after the developing solution has been spread within the image frame is stopped at positions of the fluid traps, and the film unit is ejected from the holder. Therefore, the developing solution does not leak out of the film unit. When a predetermined developing and fixing time has passed since complete ejection of the film unit from the spreading rollers 25, a positive image appears on the image receiving sheet 41, and a printed photograph can be obtained by peeling the image receiving sheet 41 off of the film unit.

It should be noted that the above-described embodiment is not intended to limit the invention, and many alternatives, variations and changes can be made without departing from the scope and sprit of the invention.

As described above, according to the invention, a method for producing a fluid trap for a film assemblage, which method can produce an environment-friendly trap easily and at low cost, is provided.

What is claimed is:

1. A method for producing a fluid trap for a film assemblage, the film assemblage containing at least one peel-apart type instant film unit and including a body which includes a rectangular parallelepiped box-shaped case body including an exposure opening formed at a top surface thereof and a film unit ejection port formed at a front wall thereof continuous to the top surface, and a film platen accommodated between the top surface and a bottom surface of the case body; the film unit including a photosensitive sheet connected to a drawing sheet and accommodated at an upper surface of the film platen such that the photosensitive sheet faces the exposure opening, and an image receiving sheet connected to the drawing sheet via a connecting sheet and accommodated at a lower surface of the film platen; the photosensitive sheet, the image receiving sheet and the drawing sheet being disposed such that when a tip of the drawing sheet projecting from the ejection port is pulled, the photosensitive sheet and the image receiving sheet overlap with each other and are pulled out from the ejection port; the drawing sheet including a pod for containing developing solution, a spacer for regulating a spreading thickness of the developing solution separably adhered at opposite end portions in a direction substantially perpendicular to a direction in which the image receiving sheet is drawn, and a fluid trap disposed at a spreading terminal end of the spacer; the method comprising:

passing a plate-shaped paper material having a uniform width and a uniform thickness through a clearance formed between a pair of rollers;

compressing the plate-shaped paper material at width-directional opposite end portions thereof such that a thickness of the paper material gradually decreases from a central portion thereof toward opposite ends thereof, and at the same time, cutting the paper material along a longitudinal direction thereof to a predetermined width; and cutting the paper material along the width direction thereof at predetermined intervals with respect to the longitudinal direction thereof.

2. The method according to claim 1, wherein compressing the plate-shaped paper material at the width-directional opposite end portions thereof such that the thickness of the paper material gradually decreases from the central portion thereof toward the opposite ends thereof comprises compressing the paper material to have a trapezoidal sectional form.

3. The method according to claim 1, wherein compressing the plate-shaped paper material at the width-directional opposite end portions thereof such that the thickness of the paper material gradually decreases from the central portion thereof toward the opposite ends thereof comprises compressing the paper material to have a segment sectional form.

4. The method according to claim 1, wherein compressing the plate-shaped paper material at the width-directional opposite end portions thereof such that the thickness of the paper material gradually decreases from the central portion thereof toward the opposite ends thereof comprises compressing the paper material to have an isosceles trapezoidal sectional form.

5. The method according to claim 1, wherein compressing the plate-shaped paper material at the width-directional opposite end portions thereof such that the thickness of the paper material gradually decreases from the central portion thereof toward the opposite ends thereof comprises compressing the paper material to have a semicircular sectional form.

6. The method according to claim 1, wherein the plate-shaped paper material has a basis weight ranging from 300 to 500 $g/m^2$.

7. The method according to claim 1, wherein the plate-shaped paper material has an apparent density ranging from 0.55 to 0.65 $g/m^3$.

8. The method according to claim 6, wherein the plate-shaped paper material has a basis weight ranging from 350 to 450 $g/m^2$.

9. The method according to claim 7, further comprising the step of applying a hot melt coating to the plate-shaped paper material.

10. The method according to claim 9, comprising providing two fluid traps to be included in the film assemblage.

11. A method of manufacturing a fluid trap for a film assemblage containing a peel-apart type instant film unit, the method comprising:

passing a plate-shaped paper material having a uniform width and a uniform thickness through a clearance formed between a pair of rollers;

compressing the plate-shaped paper material at width-directional opposite end portions thereof such that a thickness of the paper material gradually decreases from a central portion thereof toward opposite ends thereof, and at the same time, cutting the paper material along a longitudinal direction thereof to a predetermined width; and cutting the paper material along the width direction thereof at predetermined intervals with respect to the longitudinal direction thereof.

12. A system of manufacturing a fluid trap for a film assemblage containing a peel-apart type instant film unit, the system comprising:

a plate-shaped material having a basis weight ranging from 300 to 500 $g/m^2$; and a pair of rollers which processes the plate-shaped material, the pair of rollers forming a clearance through which the plate-shaped material is passed.

13. The system of claim 12, wherein the plate-shaped material has a basis weight ranging from 350 to 450 $g/m^2$.

* * * * *